(12) United States Patent
Shinozaki et al.

(10) Patent No.: US 10,442,153 B2
(45) Date of Patent: Oct. 15, 2019

(54) STIFFENED STRINGER PANEL WITH INTEGRAL INDEXING LAMINATE STACKS

(71) Applicant: The Boeing Company, Chicago, IL (US)

(72) Inventors: John M. Shinozaki, Kenmore, WA (US); Patrick B. Stickler, Everett, WA (US); Jerry D. Chungbin, Kenmore, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/852,912

(22) Filed: Dec. 22, 2017

(65) Prior Publication Data

US 2019/0193371 A1 Jun. 27, 2019

(51) Int. Cl.
| | | |
|---|---|---|
| B32B 3/00 | (2006.01) | |
| B32B 3/28 | (2006.01) | |
| B32B 5/10 | (2006.01) | |
| B32B 37/06 | (2006.01) | |

(Continued)

(52) U.S. Cl.
CPC .................. *B32B 3/28* (2013.01); *B32B 5/10* (2013.01); *B32B 37/0076* (2013.01); *B32B 37/06* (2013.01); *B32B 2305/076* (2013.01); *B32B 2398/10* (2013.01); *B32B 2605/18* (2013.01); *B64C 3/182* (2013.01); *Y10T 428/24174* (2015.01); *Y10T 428/24182* (2015.01)

(58) Field of Classification Search
CPC ..... Y10T 428/24174; Y10T 428/24182; B64C 1/064; B64C 3/182
See application file for complete search history.

(56) References Cited

U.S. PATENT DOCUMENTS

| | | | |
|---|---|---|---|
| 4,113,910 A | 9/1978 | Loyd | |
| 2016/0052251 A1* | 2/2016 | Kline | .................. B32B 38/1808 156/64 |
| 2018/0229423 A1* | 8/2018 | Thai | ...................... B29C 70/347 |

FOREIGN PATENT DOCUMENTS

| | | |
|---|---|---|
| EP | 3213989 A1 | 9/2017 |
| EP | 3360669 A2 | 8/2018 |
| EP | 3360669 A3 | 11/2018 |

OTHER PUBLICATIONS

Chungbin, Jerry D. et al., "Systems and Methods for In Situ Manufacturing of Minimally Tooled Stringers", U.S. Appl. No. 15/802,230, filed Nov. 2, 2017, 45 pgs.

(Continued)

*Primary Examiner* — Alexander S Thomas
(74) *Attorney, Agent, or Firm* — Kwan & Olynick LLP

(57) ABSTRACT

Provided are stiffened stringer panels with integrated indexing stacks. An example composite panel comprises a skin member having an inner surface. An index for positioning a support tool comprises a first set and second set of layered laminate stacks coupled to the inner surface such that a channel is formed between the first and second set of layered laminate stacks. The first and second set of layered laminate stacks is configured to cradle a support tool in the channel to automatically align the support tool relative to the panel. A stringer may include a cap portion that extends from the first set to the second set of layered laminate stacks to form flange portions on the inner surface of the skin member. The index and the skin member may be co-cured or co-bonded.

20 Claims, 13 Drawing Sheets

(51) Int. Cl.
*B32B 37/00* (2006.01)
*B64C 3/18* (2006.01)

(56) References Cited

OTHER PUBLICATIONS

"European Application Serial No. 18198823.9, Search Report dated Apr. 12, 2019", 8 pgs.

* cited by examiner

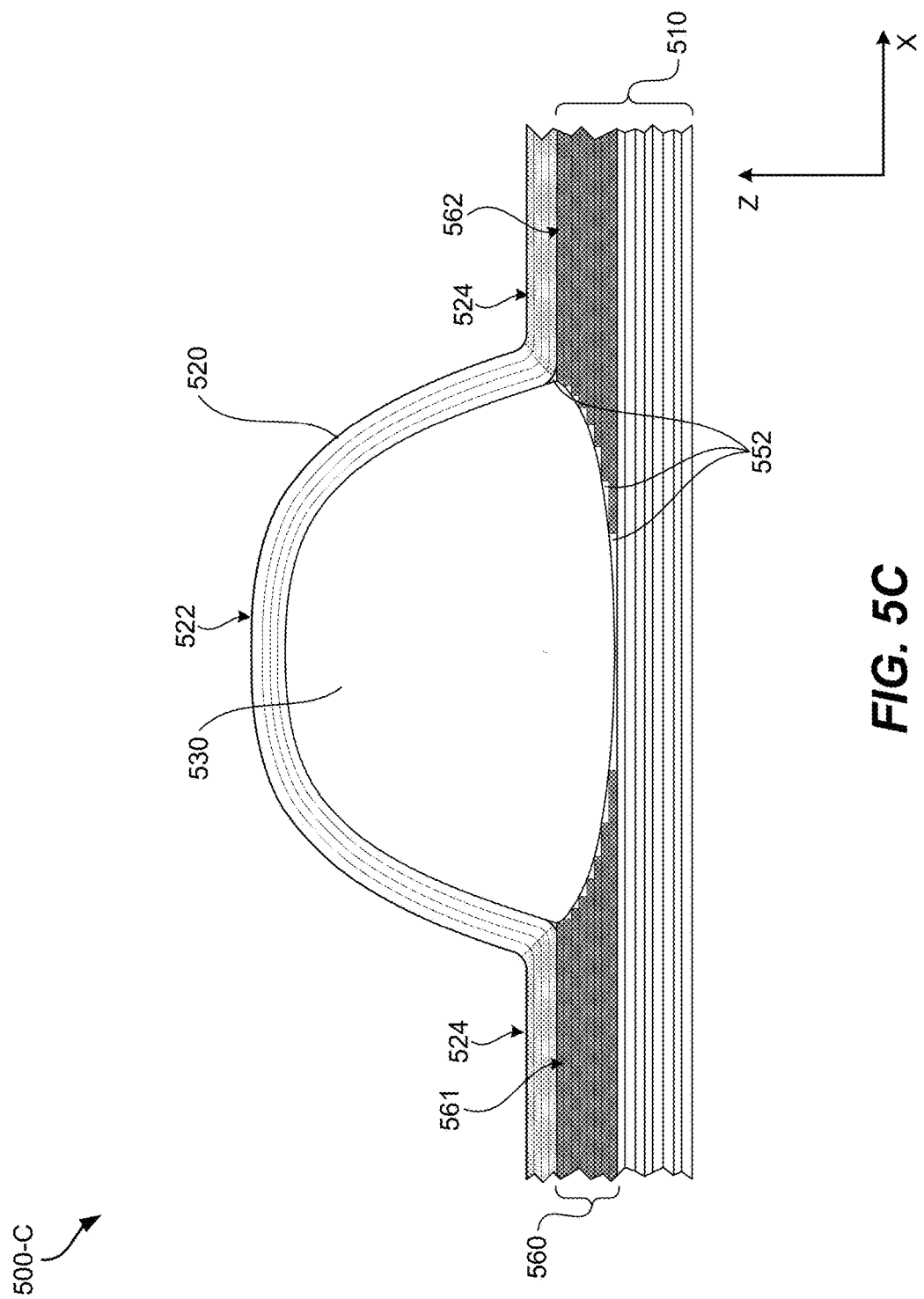

STIFFENED STRINGER PANEL WITH INTEGRAL INDEXING LAMINATE STACKS

TECHNICAL FIELD

The present disclosure relates generally to aircraft support structures and, more specifically, to stringer panels.

BACKGROUND

In aircraft and launch vehicle construction, various surfaces, such as the skin of an aircraft, may be attached to structural support members known as stringers or stiffeners. In aircraft fuselage, stringers are attached to the fuselage skin run in the longitudinal direction of the aircraft. They are primarily responsible for transferring the aerodynamic loads acting on the skin onto internal structures including frames. In the wings or horizontal stabilizer of an aircraft, stringers attach to the wing skin and their primary function here also is to transfer the bending loads acting on the wings onto internal structures such as ribs and spars.

Traditional manufacturing of stiffening members on composite parts can be tooling intensive. Given the scale of aircraft wings and fuselages, forming and handling equipment for these parts can be expensive, heavy, and require extensive factory floor space. Use of such equipment can also incur undesirable amounts of time and labor.

Thus there exists a need for improved systems and methods for manufacturing aircraft support structures that reduce the need for labor, extensive tooling, factory space, and material handling equipment.

SUMMARY

The following presents a simplified summary of the disclosure in order to provide a basic understanding of certain embodiments of this disclosure. This summary is not an extensive overview of the disclosure, and it does not identify key and critical elements of the present disclosure or delineate the scope of the present disclosure. Its sole purpose is to present some concepts disclosed herein in a simplified form as a prelude to the more detailed description that is presented later.

Provided are stiffened stringer panels with integrated indexing stacks and methods of fabricating such panels. Specifically, a composite panel comprises a skin member having an inner surface. The composite panel further comprises an index for positioning a support tool on the inner surface. The index may comprise a first set of layered laminate stacks and a second set of layered laminate stacks coupled to the inner surface such that a channel is formed between the first and second set of layered laminate stacks.

The first and second set of layered laminate stacks may be configured to cradle a support tool in the channel. In some embodiments, the support tool is a forming mandrel. In some embodiments, the support tool may lie flush against a portion of each of the layered laminated stacks. The support tool may be automatically aligned via the index.

The composite panel further comprises a stringer including a cap portion. The cap portion may span from the first set of layered laminate stacks to the second set of layered laminate stacks to form a first flange portion and a second flange portion on the inner surface of the skin member. Each flange portion may extend from the cap portion. The stringer may comprise a cover laminate including a plurality of stringer plies.

Each set of layered laminate stacks may comprise a plurality of index plies. A first filler may be positioned on top a first top index ply of the first set of laminated stacks. The second filler may be positioned on top of a second index ply of the second set of laminated stacks. The first flange portion may be located upon a first elongated base ply of the first set of laminated stacks. The second flange portion may be located upon a second elongated base ply of the second set of laminated stacks. The first and second elongated base plies may form the bottom layer of the first and second sets of laminated stacks, respectively.

In some embodiments, the index and the skin member are co-cured. In other embodiments, the index and the skin member are co-bonded. The layered laminate stacks may comprise composite fibers pre-impregnated with a resin system.

Other implementations of this disclosure include systems and methods corresponding to the described apparatus. For instance, in another aspect, which may include at least a portion of the subject matter of any of the preceding and/or following examples and aspects, an aircraft is provided which comprises one or more composite panels as described above.

Also provided is a method of manufacturing the described stiffened composite panels. The method comprises providing a skin member having an inner surface. A first set of layered laminate stacks and a second set of layered laminate stacks may then be laminated onto the inner surface of the skin member to form an index with an index channel between the first set and second set of laminate stacks.

The first and second set of laminate stacks is configured to cradle a support tool in the index channel. In some embodiments, the support tool is a forming mandrel. The method further comprises positioning the support tool within the index channel. In some embodiments, the support tool lies flush against a portion of each of the layered laminate stacks. The support tool may be automatically aligned within the index channel. The method further comprises depositing one or more stringer plies onto the support tool and the first and second set of laminate stacks to form a stringer. The skin member, first set of laminate stacks, second set of laminate stacks, and the stringer plies are then joined.

The method may further comprise positioning a first filler on top of a first top index ply of the first set of laminated stacks, and positioning a second filler on top of a second top index ply of the second set of laminated stacks.

The stringer comprises a cap portion that spans from the first set of layered laminate stacks to the second set of layered laminate stacks to form a first flange portion and a second flange portion on the inner surface of the skin member. Each flange portion extends from the cap portion.

The first flange portion may be located upon a first elongated base ply of the first set of laminated stacks and the second flange portion may be located upon a second elongated base ply of the second set of laminated stacks. The first and second base plies may form the bottom layer of the first and second sets of laminated stacks, respectively.

In some embodiments, the index and the skin member are co-cured. In other embodiments, the index and the skin member are co-bonded. The layered laminate stacks may comprise composite fibers pre-impregnated with a resin system.

These and other embodiments are described further below with reference to the figures.

BRIEF DESCRIPTION OF THE DRAWINGS

FIGS. 5A, 5B, and 5C illustrate cross-sectional views of additional examples of stiffened stringer panel with integral indexing laminate stacks, in accordance with one or more embodiments.

DETAILED DESCRIPTION OF PARTICULAR EMBODIMENTS

Figure 1:
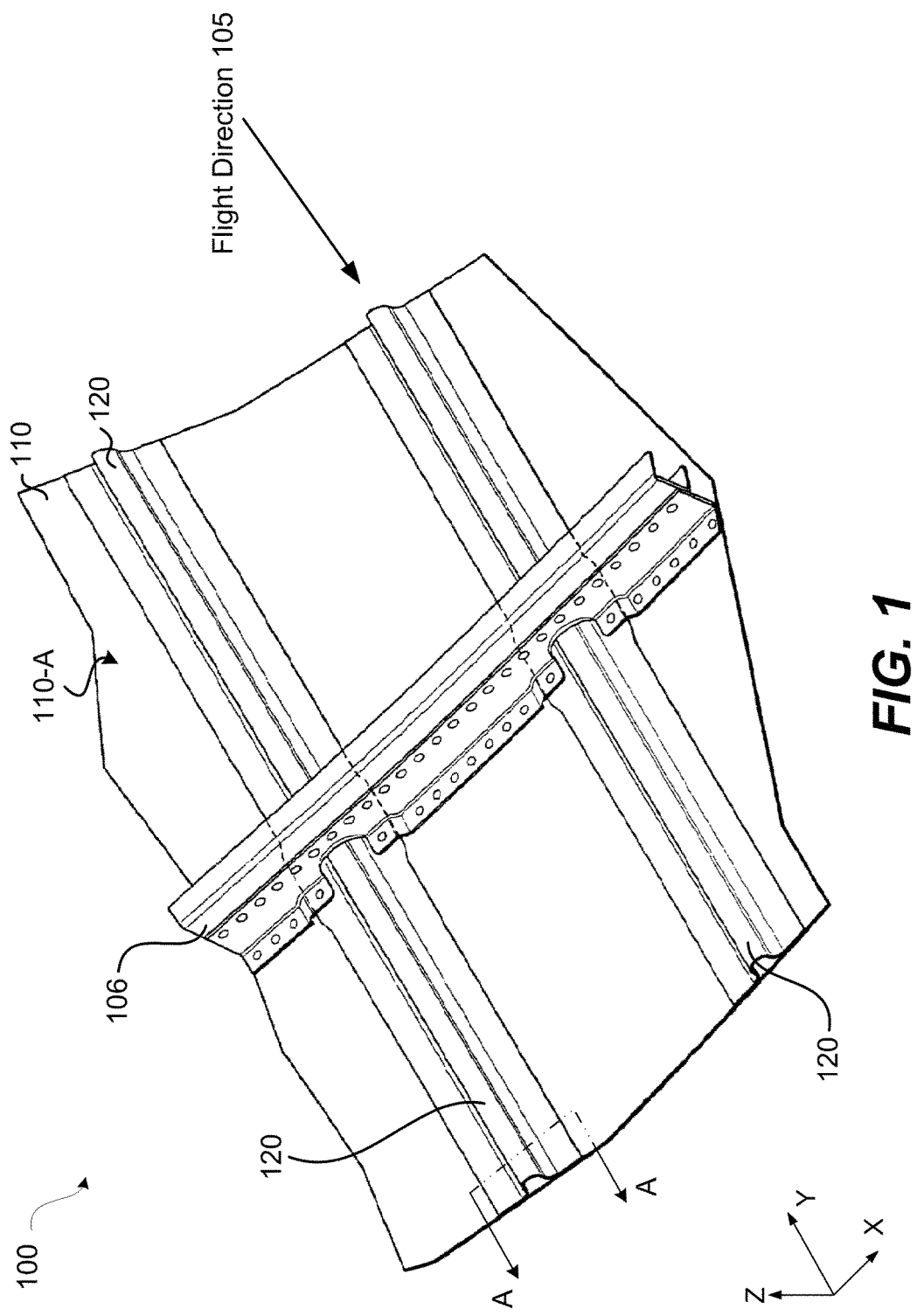
FIG. 1 illustrates an example of a stiffened stringer panel that may be implemented with various embodiments of the present disclosure.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting. On the contrary, it is intended to cover alternatives, modifications, and equivalents as may be included within the spirit and scope of the present disclosure as defined by the appended claims.

For example, the techniques of the present disclosure will be described in the context of particular aircraft structures, such as skin panels. However, it should be noted that the techniques and mechanisms of the present disclosure may apply to various other panel assemblies of various other vehicles or building structures. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure. Various techniques and mechanisms of the present disclosure will sometimes be described in singular form for clarity. However, it should be noted that some embodiments include multiple iterations of a technique or multiple instantiations of a mechanism unless noted otherwise.

Overview

The present disclosure describes novel stiffened stringer panel assemblies for aircraft and other vehicles or industrial systems. As described herein, the terms "stringers," "longerons," "stiffeners," "support structures," and "support members" may be used interchangeably. The stiffened stringer panels described herein include an integrated index comprising laminated stacks.

Each index may comprise a pair of laminated stacks including a first set of layered laminated stacks and a second set of layered laminated stacks. Each set of laminated stacks may be formed of multiple plies of composite material built onto the inner surface of the skin member of a panel. As used herein, the plies of composite material in the sets of laminated stacks forming the index may be referred to as "index plies." The first set and second set of laminated stacks may define an index channel with a particular cross-sectional shape between the two sets of laminated stacks. The laminate stacks are configured to cradle a support tool, such as a forming mandrel. The support tool may include a cross-sectional shape that corresponds to that of the index channel such that one or more portions of the support tool's surface lie flush against the laminate stacks.

Support tools are used in stiffened stringer panels during the build process to support the shape of various support structures, such as stiffeners with internal cavities, during the curing process. Such support tools must be properly aligned to ensure that support structures are in the correct location and include the proper shape for adequate structural stability.

Traditional manufacturing of stiffened stringer panels involves manual placement of support tools, which may be very labor and tooling intensive. Such existing systems may implement complex guidance systems, such as optical laser templates, to guide manual placement of support tools onto panels. Additionally, automated pick and place systems may be used to position support tools based on guidance systems, but may be expensive and labor intensive to set up over iterations of pick and place movement and measurement tests to program the automated systems to locate items (tools, stringers, and other panel parts) properly. As such, ensuring the accurate placement of the support tools or stringers may result in increased labor requirements and longer build times.

The size and flexibility of such components can also make it cumbersome or time consuming to transport, locate, and align the parts, which may require large equipment and floor space. For example, a 110 foot stringer may require a support tool of the same length. Handling of such large support tools may result in increased costs and decrease efficiencies in manufacturing throughput.

Placement of the support tool within the integrated index channels, described herein, ensures that the support tool is properly aligned relative to the stiffened stringer panel. For example, the integrated index provides guiding structures that force the support tool into proper alignment. In addition, this configuration allows for a secure placement of the support tool onto the stiffened stringer panel, which may ensures proper alignment throughout the build process. The sets laminated stacks of the index may also provide additional support for the stringer for the curing process, in addition to the support tool, as well as additional structural support for the panel. The integrated index channel may be used in conjunction with automated pick and place systems to fully automate placement and alignment of support tools during the manufacturing process. In addition, this integrated index channel may utilize automated tape placement processes and accuracy capabilities to align the tool.

Therefore, the systems and assemblies described provide improvements over existing systems of manufacturing structural support members in which placement or alignment of support tools is done manually. The described assemblies provide for automatic alignment of support tooling that is more precise and efficient than existing systems to reduce labor and eliminate the need for extensive tooling and handling equipment.

Example Embodiments

An example of a stiffened stringer panel 100 that may be implemented with various embodiments of the present disclosure is described with reference to FIG. 1. As depicted in FIG. 1, panel 100 is defined by a lateral axis (X-axis), a longitudinal axis (Y-axis), and a vertical axis (Z-axis). In some embodiments, panel 100 may be a portion of the hull of an aircraft fuselage. However, in other embodiments, panel 100 may be a portion of various other structures. For example, various panels may comprise portions of a skin panel, or structures in horizontal and vertical stabilizers or control surfaces.

As shown in FIG. 1, panel 100 comprises an outer skin member 110 with an inner surface 110-A. In various embodiments, the structure of panel 100 may include a frame 106. Panel 100 may be reinforced with one or more stiffened support structures, such as stringers 120, coupled to panel 100 along the inner surface 110-A. In some embodiments, stringers 120 may be configured such that the lengths of stringers 120 are oriented to be substantially parallel to the direction of flight 105, which is parallel to the Y-axis, as shown in FIG. 1. However, in various embodiments, stiffened support structures may be oriented at various other angles and orientations based on load paths and deflection direction in order to reduce loads and deflection of the main structure. In addition, stiffened support structures may include other orientations driven by other functionalities, such as locations needed for bracket attachments of wiring or venting gas through the stringer.

Figure 2:
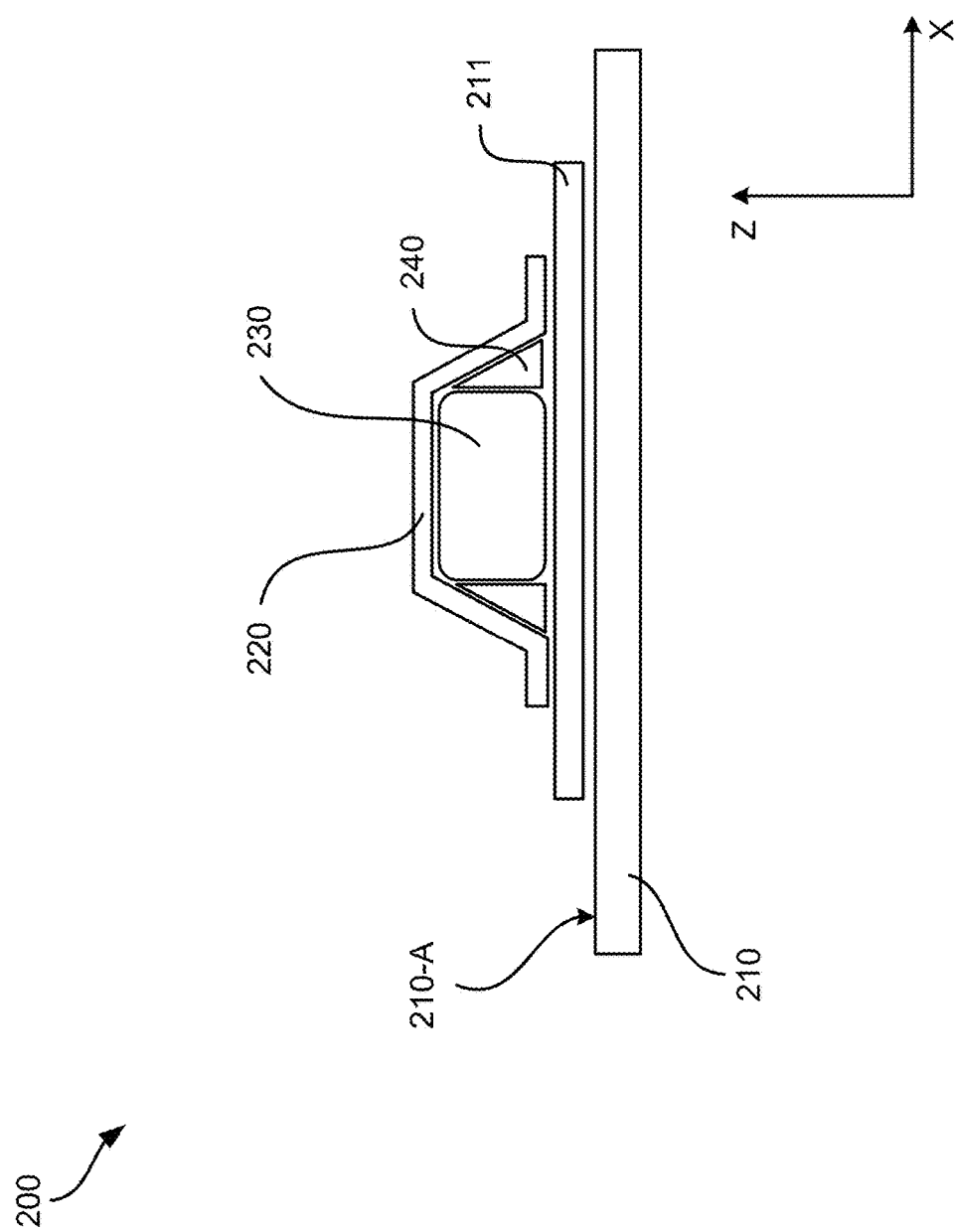
FIG. 2 illustrates a cross-sectional view of an example of existing stringer panel assembly systems.

The stringers 120 may be configured with various cross-sectional shapes for different structural properties. Various stringer types may include closed cross-sectional shapes such as hat-shape stringers, or open cross-sectional shapes, such as L-shape stringers. Other formed stringer types may include blade stringers, Z-shape stringers, C-shape stringers, etc. FIG. 2 illustrates a cross-sectional view of an example of an existing stringer panel assembly system 200. In some embodiments, system 200 may be panel 100 and FIG. 2 depicts a cross-section of a portion of the panel from the A-A viewpoint (identified in FIG. 1) corresponding to the longitudinal axis.

As shown, panel 200 comprises a skin member 210 with a hat-shaped stringer 220 along the inner surface 210-A. In some embodiments, stringer 220 may be positioned on a base charge 211 if needed for structural and manufacturing quality purposes. However, in other embodiments, stringer 220 may be directly placed on skin member 210.

In various embodiments, assembly of panels may require support tools to provide structural or positional support for stringers as they are cured or otherwise set into place. For example, support tool 230 may include a forming mandrel. Such mandrels may comprise any one of various types of mandrels, such as solid rubber mandrels, expanding rubber mandrels, washout mandrels formed of clay or powder, and flyaway foam mandrels. In other examples, support tool may be an inflatable bladder type. In some embodiments, various radius fillers may also be included, such as noodles 240 that may function to fill in gaps between the stringer 220, support tool 230, and base charge 211, or skin member 210 to prevent resin pooling during curing.

In stringer panel assemblies, such support tooling must be precisely aligned on the skin member or base charge in order to accurately control the stringer location, as well as the positioning and shape of the stringer. In existing panel assemblies, placement and/or alignment of support tools and/or stringers is most often done with large tool aids to lift, transport, and place the support tools. Accurate placement may be additionally achieved by various methods including the use of optical laser templates to guide manual placement within borders defined by lasers. Various other alignment mechanisms may be implemented to guide manual placement of the support tool. Efforts to ensure accurate manual alignment of support tools may further result in increased labor requirements and longer build times.

Additionally, support tooling generally includes long lengths that may reach up to the length equal to the length of a stringer. As previously described a stringer for a 777X aircraft may be up to 110 feet long. As such, a 110 foot solid rubber mandrel may include a significant weight. Such large support tooling may also require significant handling tools and equipment to form, flip, locate, and transport the support tooling. For example, handling pick and place equipment may be used to transport and maneuver such tooling. Because of their size, dimension variability in the support tooling placement may also occur. This may further impact fabrication efficiencies and increase labor time and costs of manufacturing throughput.

Figure 3A:
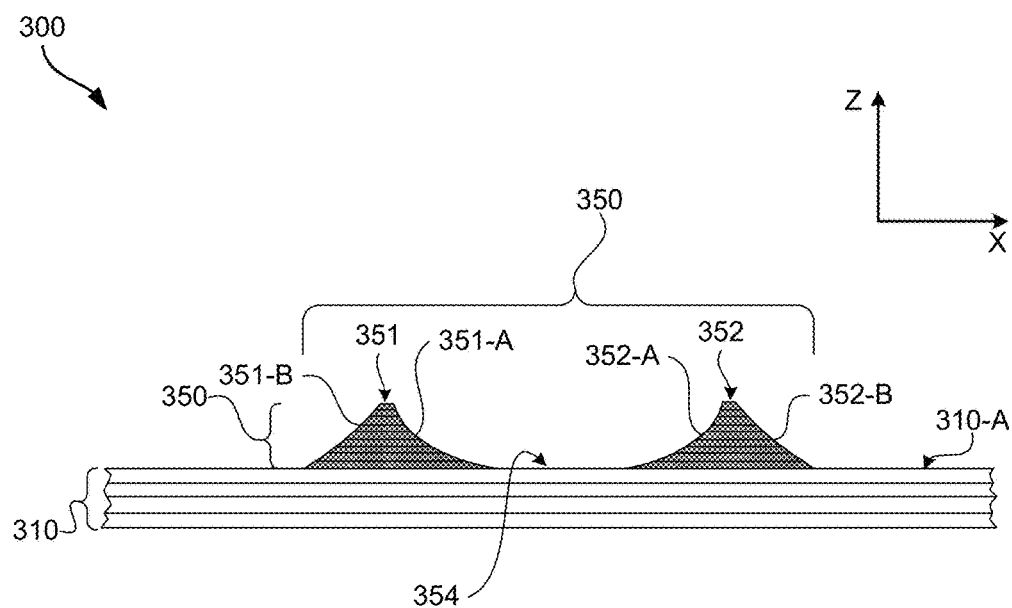
FIGS. 3A and 3B illustrate cross-sectional views of an example stiffened stringer panel with integral indexing laminate stacks, in accordance with one or more embodiments.
Figure 3B:
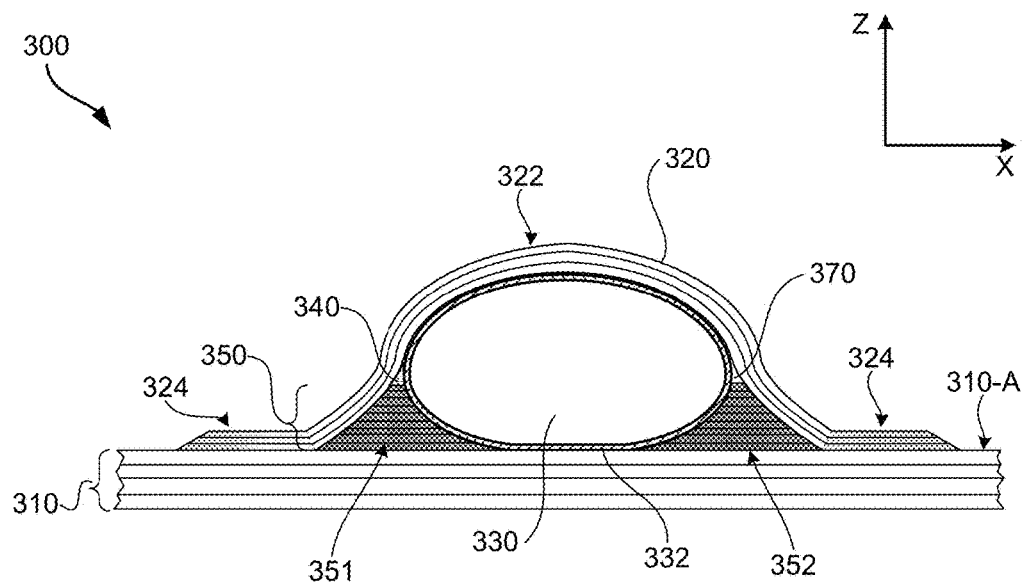

By integrating laminate stacks onto a skin member of a panel, an integrated indexing structure may be configured along the inner surface of the panel to automatically align support tooling. With reference to FIGS. 3A and 3B, shown is a cross-sectional view of an example stiffened stringer panel 300 with integral indexing laminate stacks, in accordance with one or more embodiments. In various embodiments, stiffened stringer panel 300 comprises skin member 310 with a support tool index 350 located at the inner surface 310-A of skin member 310. In some embodiments skin member 310 may comprise multiple plies or layers of composite material. As used herein, the plies of composite material comprising the skin member may be referred to as "skin member plies" or "panel plies." In some embodiments, a base charge or other higher assembly structure may be included in addition to, or in place of, skin member 310.

In various embodiments, index 350 comprises a set of laminate stacks 351 and a set laminate stacks 352. Each laminate stack may include a plurality of plies or layers of index plies formed of composite material, such as prepreg, further described with references to FIGS. 5A,B,C. Each set laminate stacks may include an outer surface and an inner surface. Laminate stack 351 includes inner surface 351-A and outer surface 351-B. Laminate stack 352 includes inner surface 352-A and outer surface 352-B.

The two sets of laminate stacks 351 and 352 may define a channel 354 between the inner surfaces 351-A and 352-A. In some embodiments, channel 354 may be defined by the inner surfaces 351-A and 352-A and the inner surface 310-A of skin member 310. However, in other embodiments, the channel 354 may be defined completely by the inner surfaces of the laminate stacks, as shown in embodiments such as FIGS. 3D and 3E. In yet other embodiments, the channel may also be defined by a base charge or other higher level assembly structure, as shown in embodiments such as FIG.

5B. In some embodiments, the shape of the channel corresponds to the shape of a portion of a support tool, such as a mandrel. As such, laminate stacks 351 and 352 may be configured to cradle a support tool within channel 354, such as support tool 330 as depicted in FIG. 3B. In some embodiments, support tool 330 may be support tool 230. In some embodiments, support tool 330 may be surrounded by an inner ply wrap 332. For example, various support tools may include prepped material such as breather white fabric or a plastic sheet.

In some embodiments, the surface of the support tool lies flush against the interior surfaces of each set of laminate stacks. In some embodiments, a bottom surface of the support tool also lies flush against the inner surface 310-A of skin member 310 or other higher level assembly structure, such as a base charge. In various embodiments, the support tool 330 is automatically aligned relative to panel 300 within index 350 when placed in channel 354. Such configuration may also provide a more secure configuration for placement of support tool 330, such that any movement of support tool 330 after placement is prevented and thus ensuring that proper alignment is maintained.

Once support tool 330 is placed within index 350 and aligned, stringer 320 may be placed onto panel 300. In various embodiments, stringer 320 is a rounded stringer with a rounded cap portion 322. As used herein the term "rounded stringer" may be used interchangeably with "rounded hat-stringer" or "omega stringer." However, it should be noted that the embodiments described herein may be implemented with various stringer shapes depending on the shape of the corresponding support tool. The cap portion 322 of stringer 320 may span from the one set of layered laminate stacks 351 to the other set of layered laminate stacks 352 and extend into flange portions 324 that lay on the inner surface 310-A of the skin member 310. In FIG. 3B, flange portions 324 are shaded for illustrative purposes. In some embodiments, stringer 320 comprises a cover laminate including a plurality of stringer plies. In some embodiments, the stringer plies may comprise a composite material. In some embodiments, such composite material of the stringer plies may be the same material as the panel plies or the index plies in layered laminate stacks 351 and 352.

The upper surface of support tool 330 may correspond to the shape of the cap portion of stringer 320. As such, the cap portion of stringer 320 may lie flush against the support tool 330. Additionally laminate stacks 351 and 352 may also provide the same function as radius fillers to further support the shape and structure of stringer 320 in conjunction with the support tool 330. Sets of laminate stacks, such as sets 351 and 352, may also contribute to the structural stiffness and integrity of the panel itself.

In some embodiments, a space 370 or gap may be present between the support tool, laminate stacks, and the stringer. This may be due to limitations on the thickness of the composite materials used to form the laminate stacks. However, such space 370 may be negligible and may not affect the capability of the laminate stacks to support stringer 320 in combination support tool 330. Such spaces may only be present during assembly of the panel in a green, uncured assembly state. After the co-curing or co-bonding process, such space 370 may be eliminated by compaction of components and resin flow.

In some embodiments, additional fillers, such as radius filler 240 may be placed on top of the sets of laminate stacks to fill in such spaces. As shown in FIG. 3B, a radius filler 340 is located on the topmost index ply of laminate stack 351 to fill in the space between the support tool 330, laminate stack 351, and stringer 320. In some embodiments, another filler may be used to fill in space 370. In other embodiments, the support tool 330 may be configured to fill in space 370 to provide more surface contact with a stringer, as will be further described with reference to FIG. 3C. Such radius fillers may be prefabricated from prepreg resin and carbon fiber of varying ratios or other substances with similar material properties.

Figure 3C:
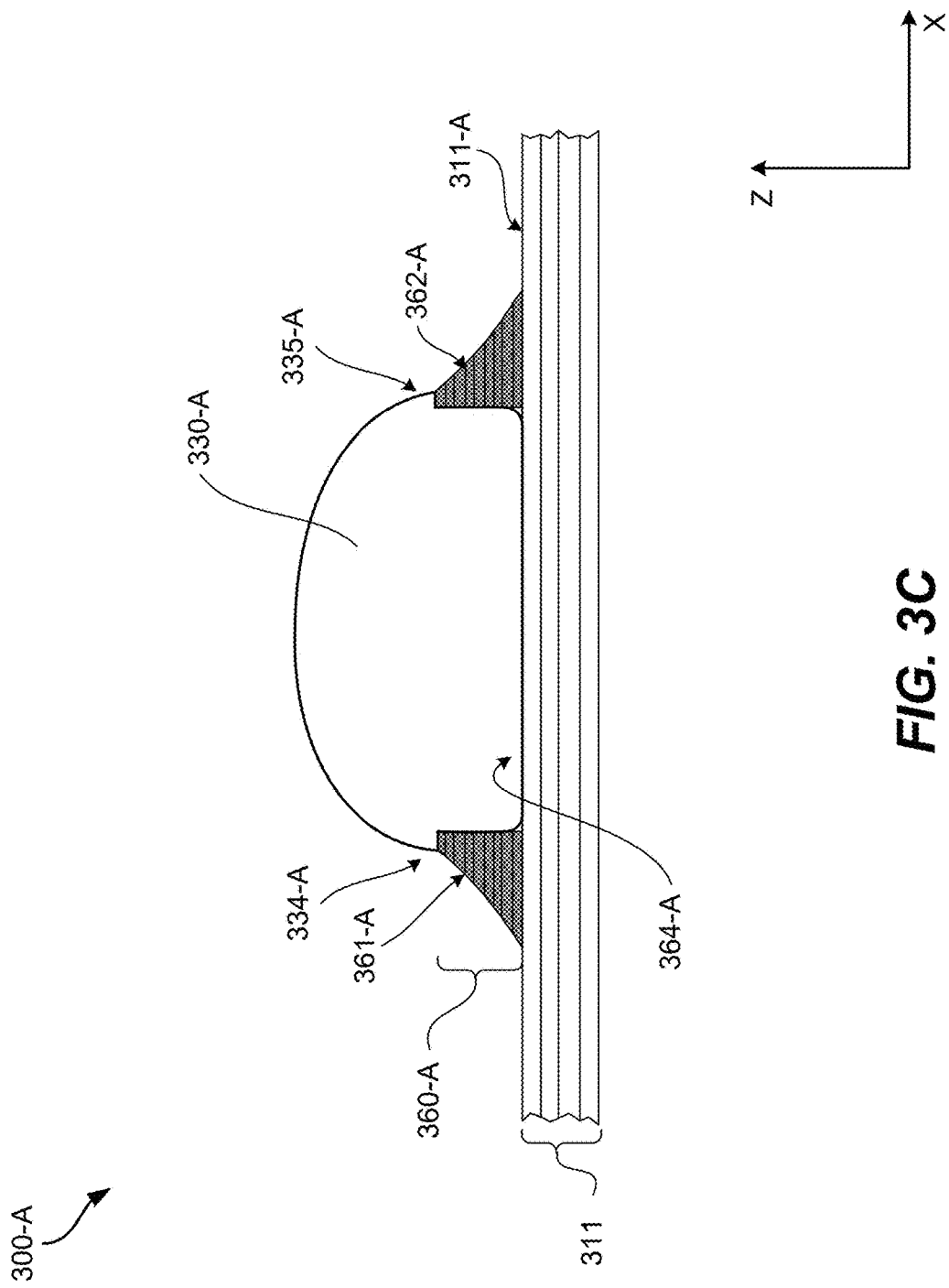
FIGS. 3C, 3D, and 3E illustrate cross-sectional views of additional examples of stiffened stringer panel with integral indexing laminate stacks and corresponding support tooling, in accordance with one or more embodiments.

In some embodiments, the laminate stacks may be configured to provide a different shape profiles for the channel to correspond to various shapes of other support tooling. As shown in FIGS. 3A and 3B, a mandrel with a rounded base is supported by laminate stacks 351 and 352. FIG. 3C illustrates a cross-sectional view of another example stiffened stringer panel 300-A with integral indexing laminate stacks. Panel 300-A in FIG. 3C includes skin member 311 with index 360-A comprising laminate stacks 361-A and 362-A on inner surface 311-A of skin member 311. As shown, the inner surfaces of laminate stacks 361-A and 362-A define a channel 364-A with a rectangular cross-section which corresponds to the shape of the base of support tool 330-A.

However, such rectangular configuration may require strict geometric tolerances between the laminate stacks and the support tool to ensure that the laminate stacks are suitably spaced apart and the support tool is sized to properly fit in between the laminate stacks. Thus, this configuration may require an accurate dimensional variance between the walls of the laminate stacks and the support tool in which the support tool is lightly undersized and the laminate stacks are slightly oversized. For example, the support tool may include a width of 2 inches+0.000 inches, −0.002 inches; and the channel may include a width of 2 inches+0.002 inches, −0.000 inches.

One benefit of a rounded channel is that a support tool with a corresponding rounded base will more easily settle into the channel. Thus, the curved embodiments, such as that shown in FIGS. 3A and 3B, as well as in FIG. 3E below, allow the centerlines of the support tool and the channel to align. The curved surfaces also reduce or eliminate any gaps that may form between the support tool and the index.

Figure 3D:
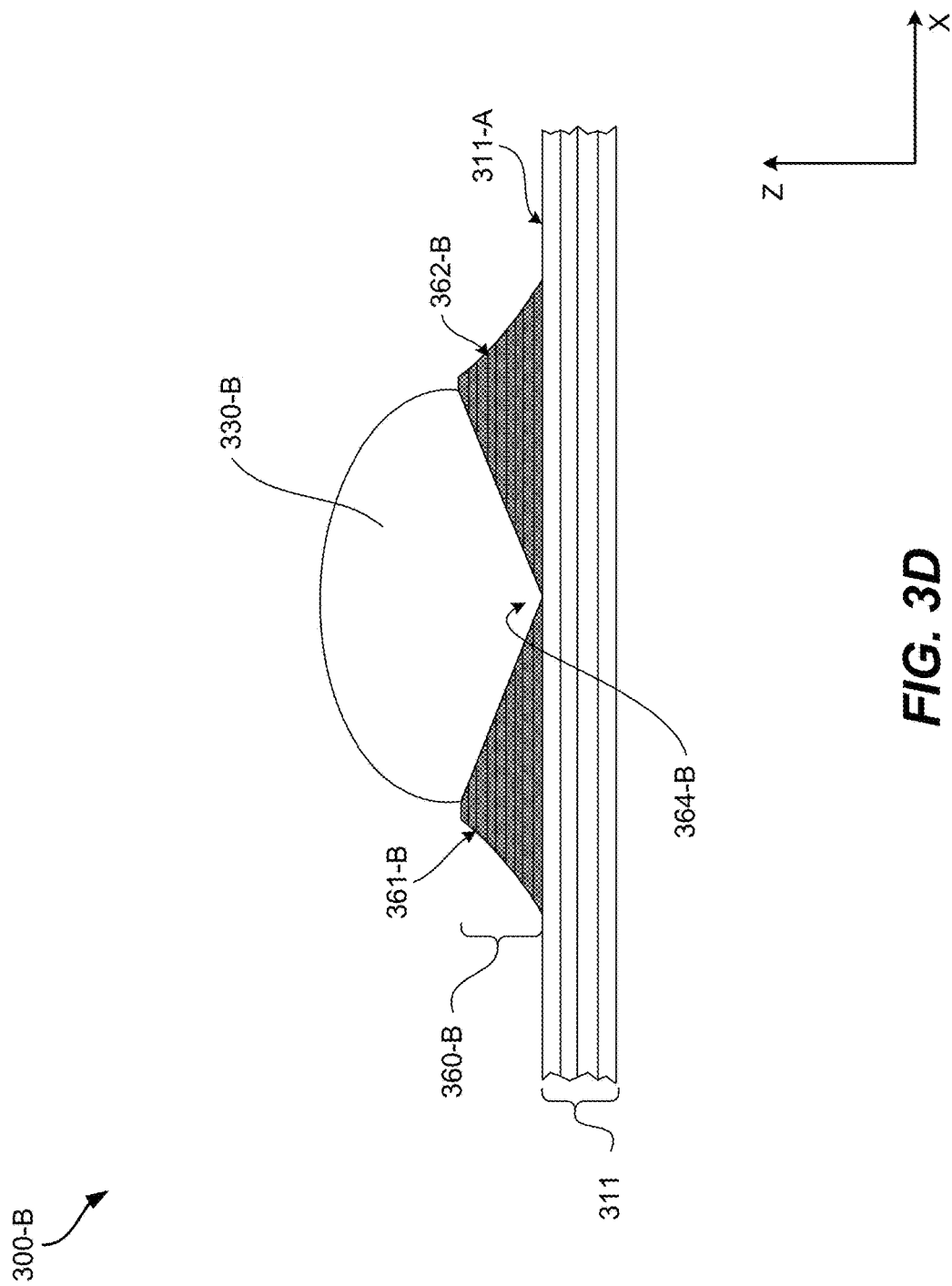

FIG. 3D illustrates a cross-sectional view of another example stiffened stringer panel 300-B with integral indexing laminate stacks. Panel 300-B in FIG. 3D includes skin member 311 with index 360-B comprising laminate stacks 361-B and 362-B on inner surface 311-A of skin member 311. As shown, the inner surfaces of laminate stacks 361-B and 362-B define a channel 364-B with a diamond cross-section which corresponds to the shape of the base of support tool 330-B. Such diamond configuration may also encourage support tool 330-B to settle into diamond shaped channel 364-B to align the centerlines of the support tool and the channel. The laminate stacks may be configured to include various other cross-sectional shapes to accommodate different support tools.

As also shown in FIG. 3C, support tool 330-A may also be configured with ledges 334-A and 335-A, that form a surface that contacts the top surface of laminate stacks 361-A and 362-A, respectively. Such ledges may provide additional support to ensure proper alignment of support tool 330-A. Additionally, the ledges may cause the shape of the support tool to be optimized to fill in gaps as much as possible. For example, the ledges may also cause the surface of support tool 330-A to be near-continuous with the outer surface of the laminate stacks to eliminate or reduce any space or gaps that may occur between the index, support tool, and stringer, such as space 370.

Figure 3E:
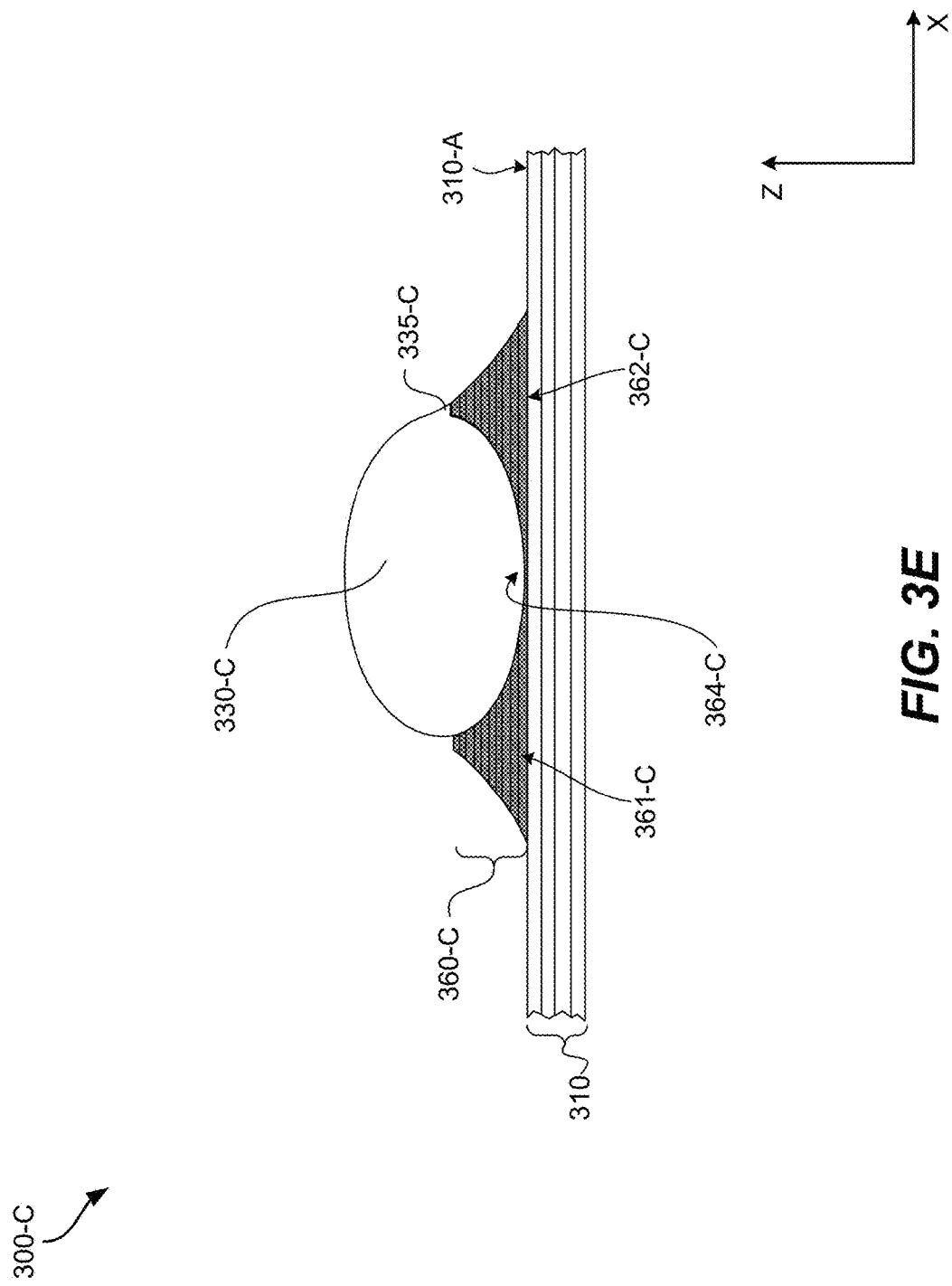

FIG. 3E illustrates a cross-sectional view of another example support tool 330-C implemented with a stiffened stringer panel 300-C with integral indexing laminate stacks, in accordance with one or more embodiments. As shown in FIG. 3E, panel 300-C includes an index 360-C with laminate stacks 361-C and 362-C that provides a fully curved channel 364-C. The index 360-C is configured to fit a support tool 330-C with a corresponding base shape. Such support tool 330-C may include only one ledge 335-C. This configuration may allow the support tool 330-C to position itself against one laminate stack, laminate stack 362-C, by rotating within channel 364-C to clock itself against the one laminate stack 362-C and settle into channel 364-C. In various embodiments, stiffened stringer panels and support tools described herein may include different combinations of configurations of ledges and base shapes to provide the desired indexing properties described above.

Thus, the described stiffened stringer panels may provide for a more simple and streamlined manufacturing of components of aircraft and other vehicles or structures. By including an integrated indexing mechanism on the panel, placement of support tools do not require imprecise manual placement or complicated guidance mechanisms and handling equipment for proper alignment. Thus, stiffened stringer panels may be constructed with more precision thereby improving quality by ensuring properly aligned panels. Furthermore, the labor and time that are required for transporting and fitting the support tools in place with expensive handling equipment in existing systems are greatly reduced. Thus, such panels reduce the labor and handling time of the support tools during manufacturing using the provided index mechanisms. Overall, the quality of manufactured panels may be improved while time and costs of the manufacturing may be reduced.

As previously described, the laminate stacks of index 350 may comprise a plurality of layers or plies of composite material. In various embodiments, the composite material may comprise various pre-impregnated composite materials (or "prepreg"), such as composite fibers pre-impregnated with a thermoset polymer matrix material or resin system, such as epoxy. For example, the resin system (typically epoxy) may already include the proper curing agent. As a result, the prepreg is ready to lay into a mold or surface, such as skin member 310, without the addition of any more resin. In some embodiments, the composite material may be resin infused or thermoformed.

In some embodiments, the laminate stacks of index 350 may be co-cured or co-bonded to skin member 310. For example, the laminate stacks may be prefabricated and cured before being joined to skin member 310 through a co-bonding process. In such example, skin member 310 may or may not be previously cured before the co-bonding process. As another example, the laminate stacks may be prefabricated and placed onto a cured skin member 310 to be co-bonded. As another example, the laminated stacks may be prefabricated and placed onto skin member 310 to be co-cured together. In such embodiments where the laminate stacks are prefabricated before joining to the skin member 310, the laminate stacks may be manually placed on the skin member 310. However, such manual placement of laminate stacks may also require precise measuring and guidance to ensure accurate alignment of the support tools.

In other embodiments, the laminate stacks of index 350 may be deposited as strips of composite material onto skin member 310 for co-curing or co-bonding. In some embodiments, strips of composite material may be automatically deposited by a robotic arm assembly or gantry system with an end effector. For example, the composite strips may be stored on a rotatable reel and dispensed to be formed and/or deposited onto the assembly structure. Thus, forming the laminate stacks of the index using automatic deposition of composite strips may further enhance precision and alignment due to human error in stiffened stringer panels. In other examples, the laminate stacks of index 350 may be directly deposited by an automated fiber placement machine or other lamination equipment capable of ply by ply placement of composite material in variable widths.

Figure 4:
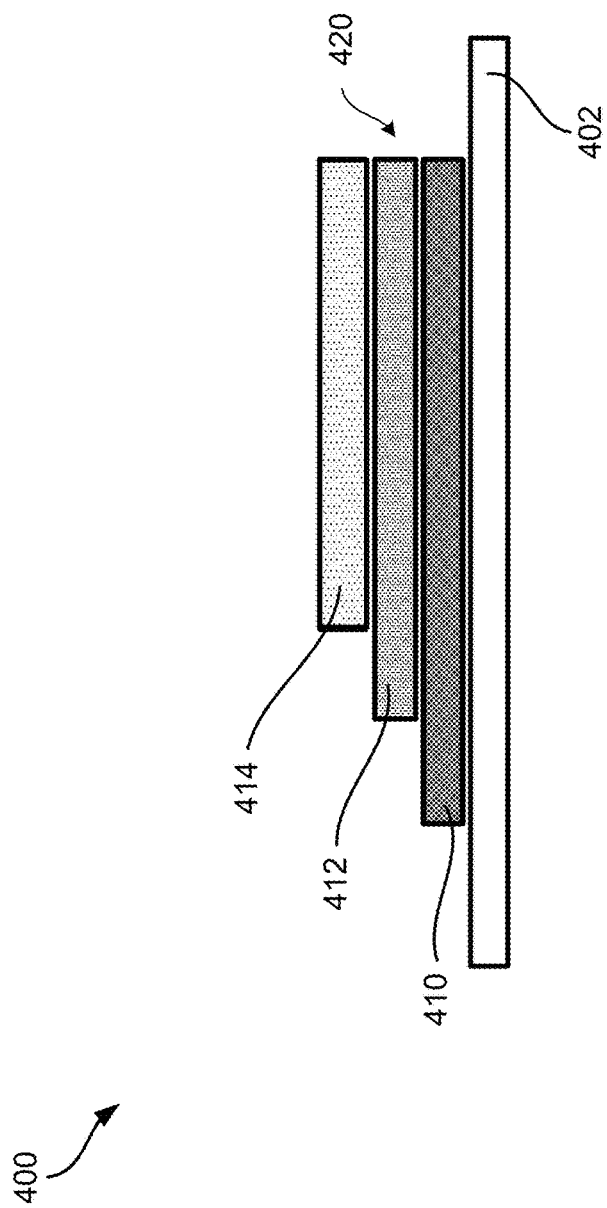
FIG. 4 illustrates various layers of composite material that can be used with various embodiments of the present disclosure.

An example of a composite material strip that can be used with various embodiments of the present disclosure is depicted in FIG. 4. Composite strip 400 may include one or more layers of material. As shown in FIG. 4, the composite strip 400 may include first layer 410, second layer 412, and third layer 414. However, in various embodiments, composite strip 400 may include any number of layers. In some embodiments, the layers may comprise the same or different materials and configurations. In some embodiments, multiple layers may be included in a strip of composite material 400 to optimize the rate of deposit onto a higher level assembly structure. For example, including multiple layers in a single composite strip 400 may be included to achieve the desired thickness for each laminate stack. Including multiple layers may also reduce the need for additional material to be deposited, thereby reducing the possibility of errors during manufacturing. Once deposited, the strip of composite material may be cut or separated from the end effector. In some embodiments, additional strips may be placed on a panel to form overlapping, discontinuous, or continuous plies. In some embodiments, a single index may include overlapping or discontinuous index plies. In some embodiments, each ply of a laminate stack may be deposited individually as one layer of composite strip 400.

However, in other embodiments, multiple layers may be combined and pre-laminated before deposition. In some embodiments, multiple layers may be combined for various desired mechanical properties. For example, adjacent layers may include fibers that are configured perpendicularly to the fibers in the other to increase strength of the total composite material. In some embodiments, the width of each layer may be varied to accommodate various design properties or shapes of a laminate stack. For example, as shown in FIG. 4, first layer 410 may include a greater width relative to second layer 412, which in turn may include a greater width relative to third layer 414. Furthermore, the layers are aligned at edge 420. As the strip of composite material is deposited onto inner surface 310-A of skin member 310, the strip may form the first three layers of laminate stack 361-A. Additional layers with narrower widths may then be deposited onto strip 400 to complete formation of laminate stack 361-A.

In some embodiments, composite material 400 is lined with backing substrate 402, which may prevent undesired adhesion of composite material 400 to itself on the storage reels or to other components of a robotic arm system. In various embodiments, the backing substrate may comprise various materials, such as paper, plastic, film, cloth, etc. Thus, backing substrate 402 may not be required for resin infused materials. In various embodiments, the backing substrate would be removed before placement of the composite material on the panel.

In various embodiments, one or more plies of skin member 310 may also be manufactured using such strips of composite material, as described above. In some embodiments, one or more plies of stringer 320 may also be manufactured using strips of composite material. For example, once support tool 330 is properly positioned and aligned within index 350, a robotic arm assembly may form a strip of composite material, such as composite strip 400, into one or more stringer plies to be deposited as the cover laminate of stringer 320. In some embodiments, stringer 320 may be co-cured along with the laminate stacks and/or the skin member. In other embodiments, stringer 320 may be co-bonded to the laminate stacks and/or the skin member.

Figure 5A:
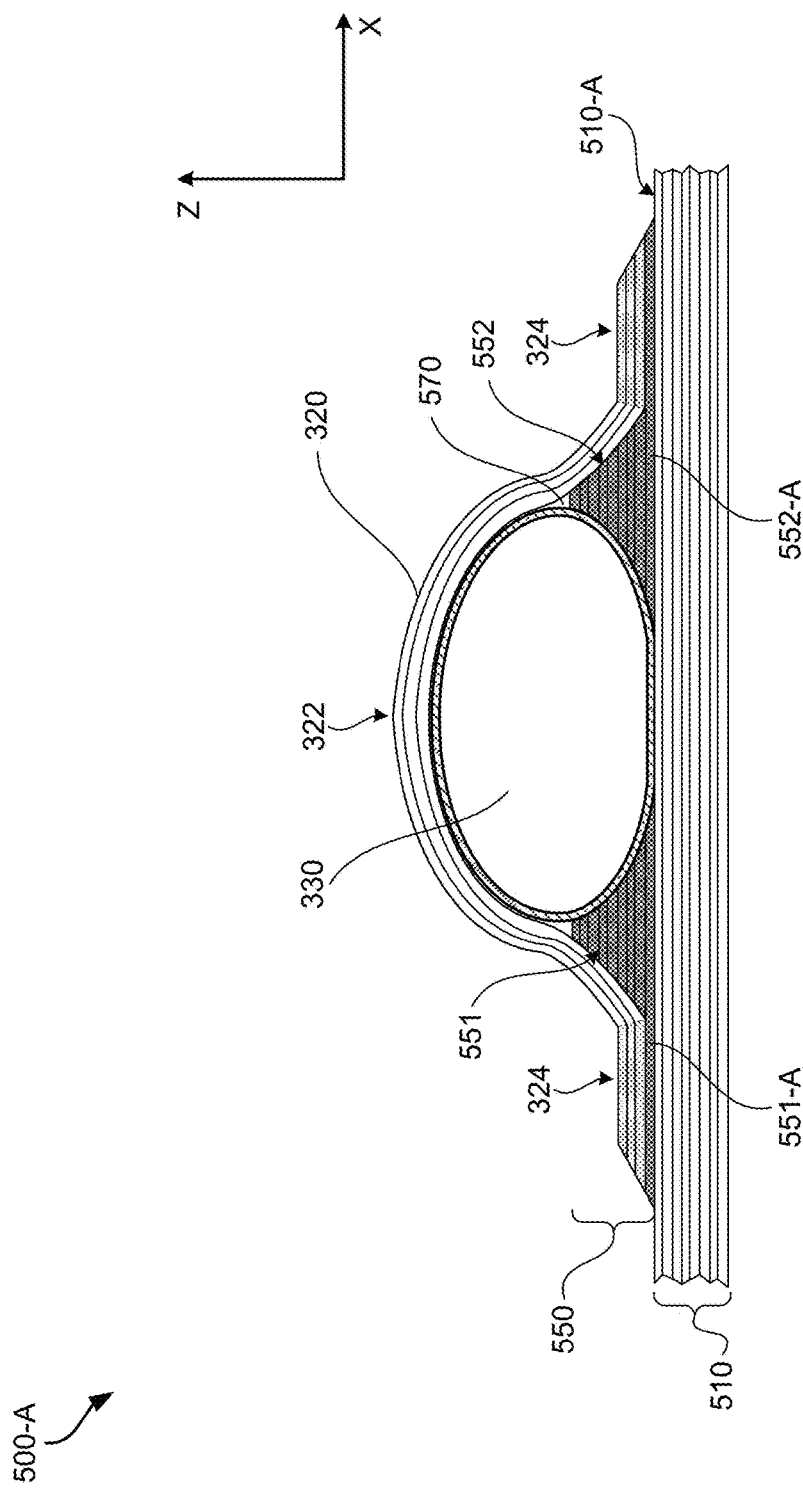
Figure 5B:
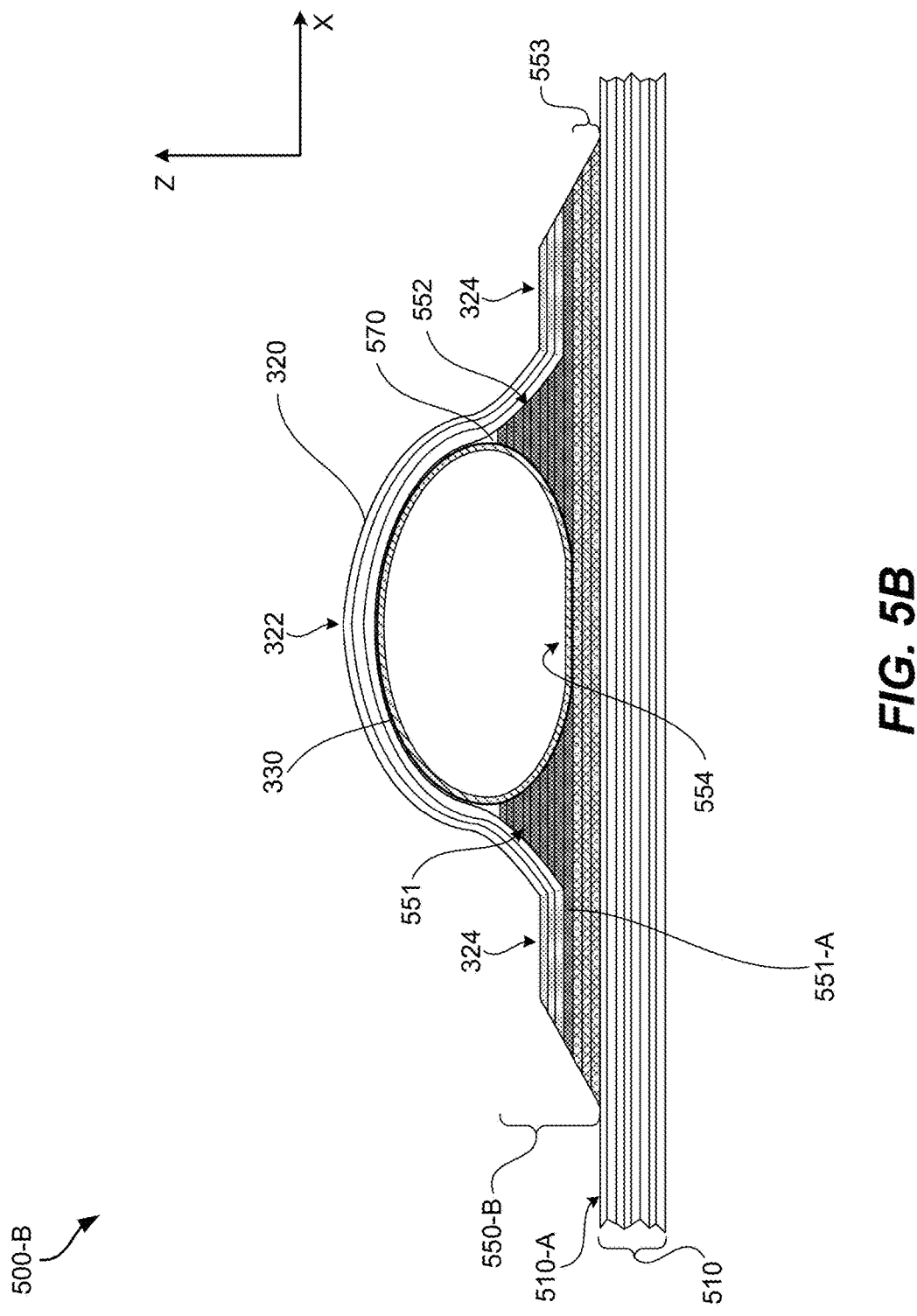

FIGS. 5A, 5B, and 5C illustrate additional configurations of example stiffened stringer panels, in accordance with one or more embodiments. In some embodiments, the flange portions 324 of stringer 320 may be configured to lie upon portions of index 350. For example, in FIG. 5A, shown is a cross-sectional view of an example stiffened stringer panel 500-A with an index 550 comprising of laminate stacks that include an elongated base ply. Each elongated base ply may form the bottom layer index ply in each set of laminated stacks. As shown, index 550 comprises laminate stack 551 with elongated base ply 551-A and laminate stack 552 with elongated base ply 552-A. The elongated base plies 551-A and 552-A are each configured on inner surface 510-A of skin member 510, with additional plies built on top. In some embodiments, the sets of layered laminate stacks may include multiple elongated base plies.

As shown, index 550 may be configured to hold support tool 330, similar to index 350. Once support tool 330 is positioned on panel 500-A within index 550, stringer 320 may be placed on panel 500-A. Similar to FIG. 3B, the cap portion 322 of stringer 320 may span from the one set of layered laminate stacks 551 to the other set of layered laminate stacks 552 and extend into flange portions 324. As shown the cap portion 322 of stringer 320 is supported by support tool 330 and the laminate stacks of index 550. However, the flange portions 324 of stringer 320 are configured to lay upon the elongated base plies 551-A and 552-A instead of directly on inner surface 510-A of skin member 510.

Such embodiments may be implemented based on the materials and joining methods used to construct the stiffened stringer panels. For example, it may be desired to join stringer 320 to panel 500-A by co-curing. Skin member 510 may have been preformed and cured. Thus, laminate stacks 551 and 552 may be deposited onto skin member 510 along with stringer 320 to be co-cured together.

In some embodiments, the composite plies of the index may be built upon a base charge such that the indexing channel is located on or within the base charge. FIG. 5B illustrates a cross-sectional view of an example stiffened stringer panel 500-B with an index 550-B comprising a laminate stacks 551 and 552 built upon base charge 553. In some embodiments, base charge 553 and laminate stacks 551 and 552 may be a single structure.

In other embodiments, the layered laminate stacks are integral parts of the skin member. For example, the layered laminate stacks of the index are constructed within the laminated panel plies of the skin member where discontinuous panel plies form the index channel. FIG. 5C illustrates a cross-sectional view of an example stiffened stringer panel 500-C with an index 550 comprising of laminate stacks that are constructed within skin member 510. In various embodiments, laminate stacks 561 and 562 of index 560 may be constructed as part of skin member 510. In other words, the laminate stack plies may be the panel plies of skin member 510. In some embodiments, one or more plies of the laminate stacks 561 and 562 are continuous along the length of the panel plies of skin member 510. In some embodiments, the laminate stack plies may comprise the same material as skin member 510. Such examples, may be implemented where the index 560 and skin member 510 are prefabricated together.

Support tool 530 may then be positioned and aligned within index 560. Similar to spaces 370, space 570 may exist between the laminate structures or between the laminate structures and the support tool. However, such spaces 570 may be negligible and will not affect support capabilities of the index with sufficient contact against the surface of the support tool 530.

Hat stringer 520 may then be deposited onto panel 500-C. In FIG. 5C, flange portions 524 of stringer 520 are shaded for illustrative purposes. As shown in FIG. 5C, the cap portion 522 of stringer 520 may be entirely supported by support tool 530 in some embodiments. The flange portions 524 of stringer 520 are configured to lay on the laminate stacks 561 and 562 of skin member 510. As such, in some embodiments, the laminate stacks of an index may not be used to support the shape and/or position of stringer 520.

Method of Operation

Figure 6:
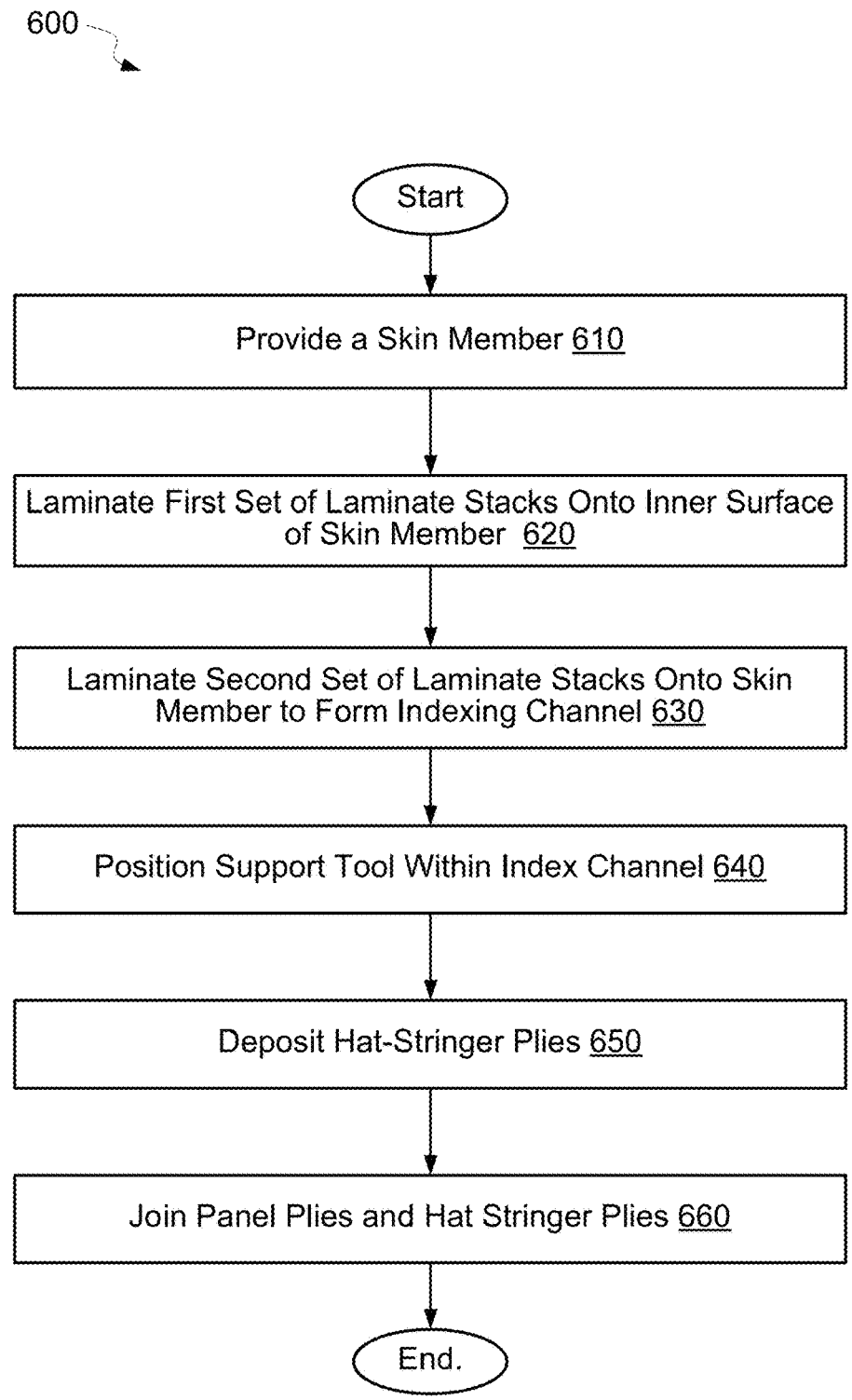
FIG. 6 illustrates an example process for manufacturing a stiffened composite panel with integral indexing laminate stacks, in accordance with one or more embodiments.

Also provided are methods of manufacturing a stiffened composite panel. With reference to FIG. 6, shown is an example method 600 for fabricating a stiffened composite panel, in accordance with one or more embodiments. In various embodiments, various structures described may be automatically formed and deposited by a robotic end effector for automatic placement of composite materials with minimum tooling during manufacturing.

At step 610, a skin member is provided. In some embodiments, the skin member may be skin member 310 with inner surface 310-A. In some embodiments, a plurality of panel plies may be laminated to form the skin member. Then, a first set of layered laminate stacks is laminated onto the inner surface of the skin member at step 620. In some embodiments, the first set of laminate stacks may be laminate stack 351. At step 630, a second set of layered laminate stacks is laminated onto the inner surface of the skin member. In some embodiments, the second set of laminate stacks may be laminate stack 352.

In some embodiments, steps 620 and 630 may be performed simultaneously, consecutively, or concurrently. For example, a series of index plies may be laminated at step 620 to build up the first set of laminate stacks before a subsequent series of index plies are laminated at step 630 to build up the second set of laminate stacks. As another example, each index ply for the first set of laminate stacks and second set of laminate stacks may be laminated onto the skin member simultaneously such that the first and second set of laminate stacks are built up at the same time. In yet another example, each index ply for each set of laminate stacks may be placed one at a time before a subsequent index ply for each set of laminate stacks are placed consecutively in each set of laminate stacks.

As previously described, a set of laminate stacks may be laminated by depositing a single index ply at a time. However, in some embodiments, multiple index plies may be deposited at each step 620 or 630. For instance, two or more index plies may be laminated at a time for each set of laminated stacks. As an example, such pre-laminated index plies may be created using the laminate equipment such as the Fives Forest-Line ATLAS or ACCESS machines.

In various embodiments, additional sets of laminate stacks may be laminated onto the inner surface of the skin member. For example, six sets of laminate stacks maybe laminated to provide three index channels. Such additional sets of laminate stacks may be placed simultaneously, consecutively, or concurrently with the first and second sets of laminate stacks, as previously described with regards to steps 620 and 630.

The sets of laminate stacks may subsequently be co-cured or co-bonded with the laminated panel plies of the skin member. In embodiments where the sets of laminate stacks and the skin member or co-bonded, adhesive film may be placed between the sets of laminate stacks and the skin member to aid in attachment of the sets of laminate stacks to the skin member.

In some embodiments, an index with an index channel is formed between the first set and second set of laminate stacks. The formed index channel may be channel 354 of index 350, or channel 364-A of index 360-A. The first and second sets of laminate stacks may be configured to cradle a support tool, such as support tool 330, in the index channel. As previously described, the laminate stacks of the index may be configured to provide a channel with various desired cross-sectional shapes. Thus, the support tool with a corresponding cross-sectional base shape may be automatically aligned within the index channel relative to the composite panel.

At step 640, the support tool is positioned within the index channel. The base of the support tool may include a cross-sectional shape that corresponds with that of the channel in order to fit securely within the index. In some embodiments, one or more surfaces of the support tool may lie flush against portions of the surfaces of the layered laminate stacks.

At step 650, a stringer may be placed onto the skin member, the first and second set of laminate stacks, and the support tool. In some embodiments, the stringer may be stringer 320 comprising one or more stringer plies. As previously described, the stringer may comprise a curved cap portion that spans from the first set of laminate stacks to the second set of laminate stacks. The cap portion may be supported by the support tool and the laminate stacks of the index. However in some embodiments, the cap portion may only be supported by the support tool. Each end of the cap portion may extend into a flange portion, such as flange portion 324, which may lie on the index or the skin member.

As previously described, the stringer may comprise a plurality of stringer plies. In some embodiments, the stringer may be prefabricated before being placed onto the skin member, laminate stacks and support tooling as described above. However, in other embodiments, one or more stringer plies may be consecutively deposited on top of each other in step in 650. Optionally, one or more fillers, such as noodles 240, may be positioned on the top of each set of laminate stacks. This may provide additional support for the shape of the stringer and fill additional space between the stringer and the support tool or the skin member.

At step 660, the panel plies of the skin member and the stringer plies are joined. As described, the skin member and the stringer may be co-cured or co-bonded. The co-curing or co-bonding process may also join the index plies of the sets of laminate stacks to the skin member and/or the stringer plies. In some embodiments, the panel, including the skin member and the stringer, may be placed within a vacuum bag for additional pressure to hold the composite layers in place for curing or bonding.

Aircraft Examples

Figure 7:
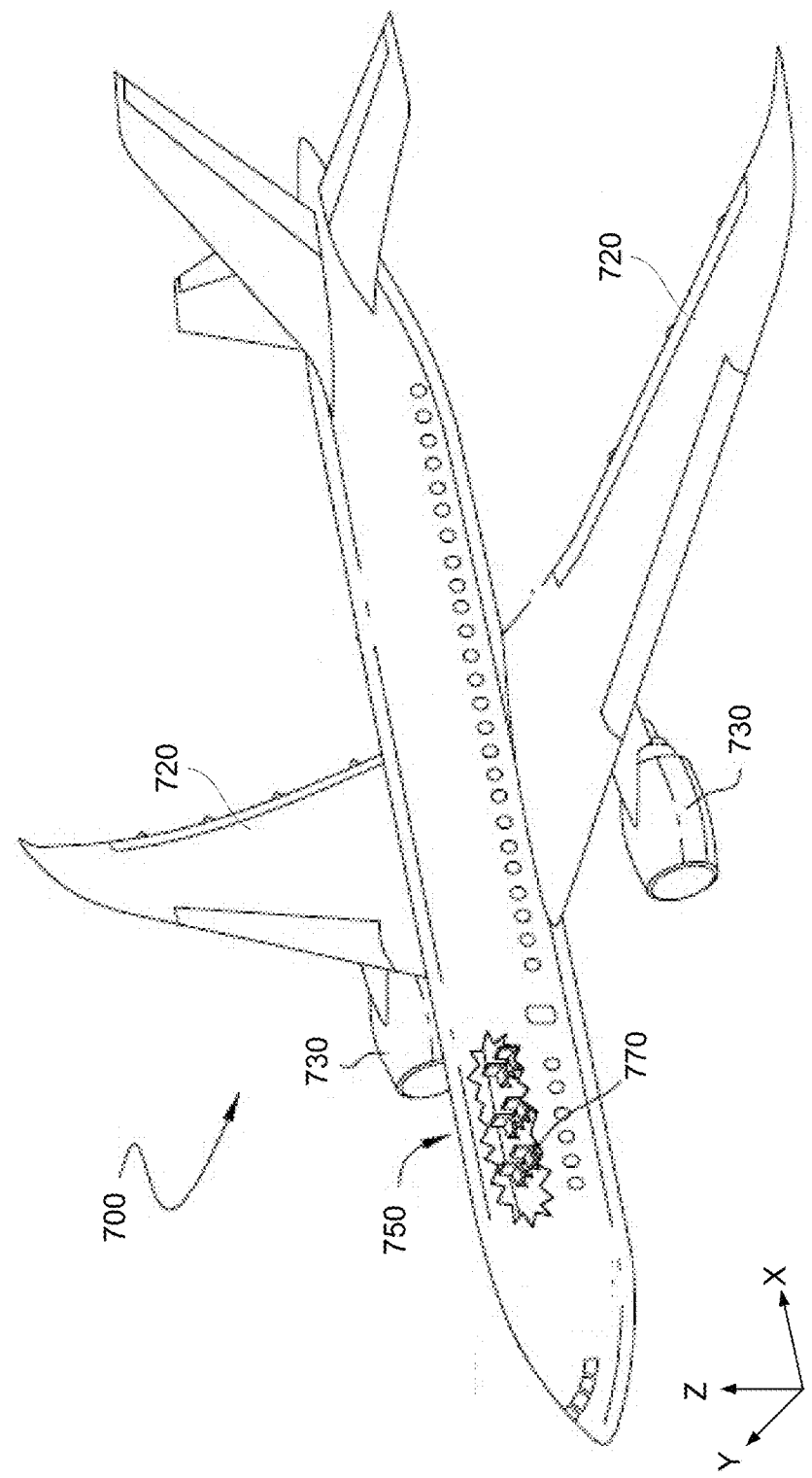
FIG. 7 is a schematic illustration of an aircraft that may include stiffened stringer panels as described herein, in accordance with one or more embodiments.
Figure 8:
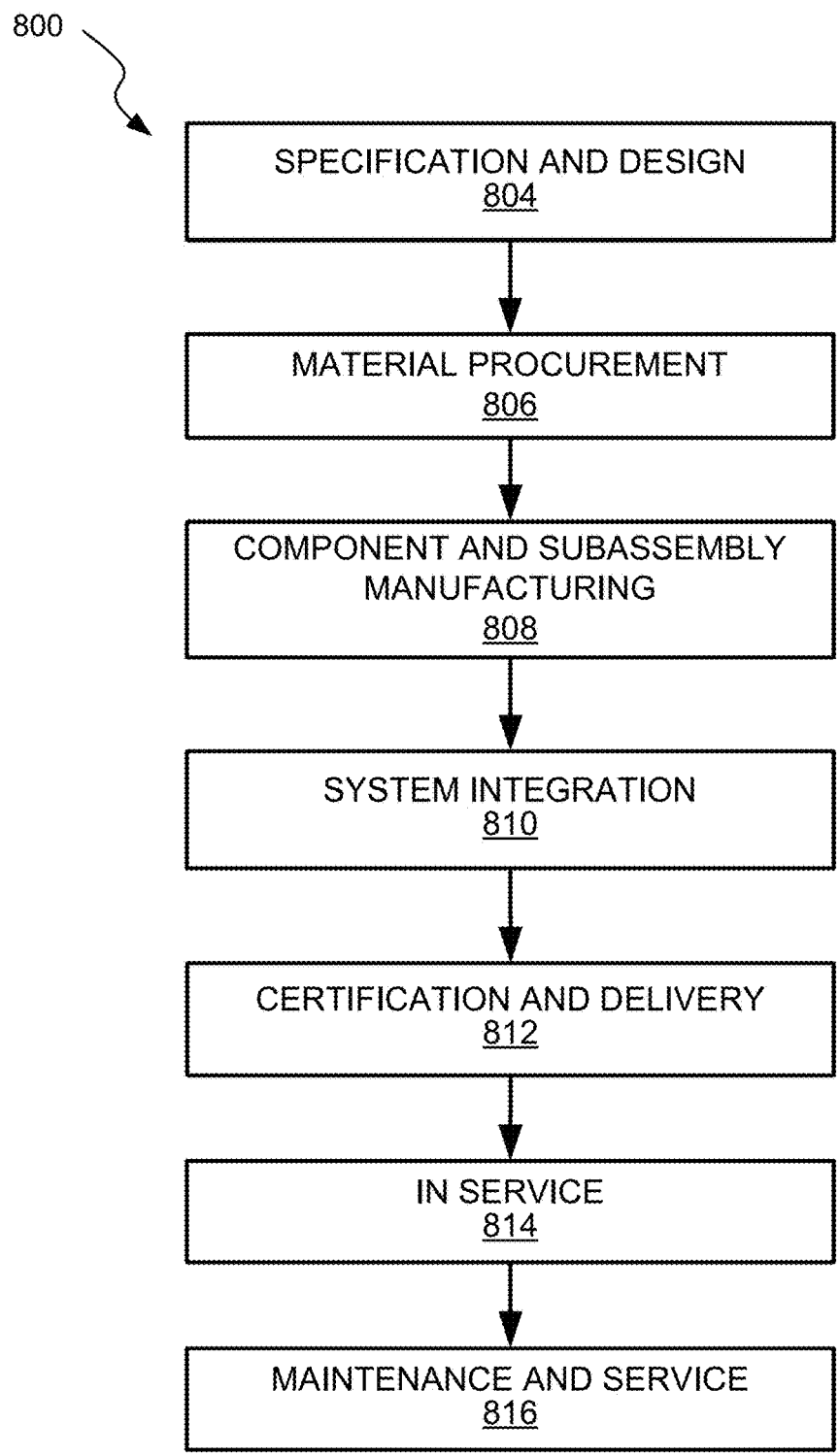
FIG. 8 is a block diagram of aircraft production and service methodology that may utilize methods and assemblies described herein.

Examples of the present disclosure may be described in the context of aircraft 700 as shown in FIG. 7 and aircraft manufacturing and service method 800 as shown in FIG. 8. FIG. 7 is a schematic illustration of an aircraft 700 that may comprise stiffened stringer panels as described herein, in accordance with one or more embodiments. As depicted in FIG. 7, aircraft 700 comprises airframe 750 with interior 770. Aircraft 700 includes wings 720 coupled to airframe 750. Aircraft 700 may also include engines 730 supported by wings 720. Aircraft 700 is one example of a vehicle in which the systems and methods described, such as stiffened stringer panel 100, may be implemented and operated, in accordance with an illustrative embodiment. Although an aerospace example is shown, the principles disclosed herein may be applied to other industries, such as the automotive industry. Accordingly, in addition to aircraft 700, the principles disclosed herein may apply to other vehicles, e.g., land vehicles, marine vehicles, space vehicles, etc.

FIG. 8 is a block diagram of aircraft production and service methodology that may utilize methods and assemblies described herein. During pre-production, illustrative method 800 may include specification and design (block 804) of aircraft 700 and material procurement (block 806). During production, component and subassembly manufacturing (block 808) and inspection system integration (block 810) of aircraft 700 may take place. Described apparatus, and corresponding methods of operation, may be implemented in any of specification and design (block 804) of aircraft 700, material procurement (block 806), component and subassembly manufacturing (block 808), and/or inspection system integration (block 810) of aircraft 700.

Thereafter, aircraft 700 may go through certification and delivery (block 812) to be placed in service (block 814). While in service, aircraft 700 may be scheduled for routine maintenance and service (block 816). Routine maintenance and service may include modification, reconfiguration, refurbishment, etc. of one or more inspection systems of aircraft 700. Described apparatus, and corresponding methods of operation, may be implemented in any of certification and delivery (block 812), service (block 814), and/or routine maintenance and service (block 816).

Each of the processes of illustrative method 800 may be performed or carried out by an inspection system integrator, a third party, and/or an operator (e.g., a customer). For the purposes of this description, an inspection system integrator may include, without limitation, any number of aircraft manufacturers and major-inspection system subcontractors; a third party may include, without limitation, any number of vendors, subcontractors, and suppliers; and an operator may be an airline, leasing company, military entity, service organization, and so on.

CONCLUSION

In the above description, numerous specific details are set forth to provide a thorough understanding of the disclosed concepts, which may be practiced without some or all of these particulars. In other instances, details of known devices and/or processes have been omitted to avoid unnecessarily obscuring the disclosure.

While the present disclosure has been particularly shown and described with reference to specific embodiments thereof, it will be understood by those skilled in the art that changes in the form and details of the disclosed embodiments may be made without departing from the spirit or scope of the present disclosure. It is therefore intended that the present disclosure be interpreted to include all variations and equivalents that fall within the true spirit and scope of the present disclosure. Accordingly, the present examples are to be considered as illustrative and not restrictive.

Although many of the components and processes are described above in the singular for convenience, it will be appreciated by one of skill in the art that multiple components and repeated processes can also be used to practice the techniques of the present disclosure.

What is claimed is:

1. A composite panel comprising:
a skin member having an inner surface,
an index coupled to the inner surface of the skin member for positioning a support tool on the inner surface, the index comprising:
a first index stack of a first plurality of index plies,
a second index stack of a second plurality of index plies, and
a channel formed between an interior side of each of the first index stack and the second index stack,
wherein the first index stack and the second index stack are configured to cradle a support tool in the channel; and
wherein each of the first plurality of index plies and the second plurality of index plies comprises an elongated base ply as a bottom layer containing the inner surface of the skin member, wherein an upper surface of each elongated base ply is substantially exposed from the respective plurality of index plies; and
a stringer comprising:
a cap portion extending from an exterior side of the first index stack to an exterior side of the second index stack,
a first flange portion extending from a first side of the cap portion, the first flange portion located upon the upper surface of the elongated base ply of the first plurality of index plies, and
a second flange portion extending from a second side of the cap portion, the second flange portion located upon the upper surface of the elongated base ply of the second plurality of index plies.

2. The composite panel of claim 1, wherein the stringer comprises a cover laminate including a plurality of stringer plies.

3. The composite panel of claim 1, wherein the first index stack and the second index stack are configured to cradle the support tool such that the support tool lies flush against a portion the interior side of each of the first index stack and the second index stack.

4. The composite panel of claim 1, wherein the index and the skin member are co-cured.

5. The composite panel of claim 1, wherein the index and the skin member are co-bonded.

6. The composite panel of claim 1, wherein the support tool is a forming mandrel.

7. The composite panel of claim 1, wherein each index stack comprises composite fibers pre-impregnated with a resin system.

8. The composite panel of claim 1, wherein the support tool is automatically aligned within the index.

9. The composite panel of claim 1,
wherein a first filler is positioned on top of a first top index ply of the first plurality of index plies, and a second filler is positioned on top of a second top index ply of the second plurality of index plies.

10. A method of manufacturing a stiffened composite panel, the method comprising:
providing a skin member having an inner surface;
constructing a first index stack on the inner surface of the skin member, wherein the first index stack comprises a first plurality of index plies, wherein the first index stack is constructed by consecutively depositing groupings of one or more of the first plurality of index plies upon the inner surface of the skin member;
constructing a second index stack on the inner surface of the skin member, wherein the second index stack comprises a second plurality of index plies, wherein the second index stack is constructed by consecutively depositing groupings of one or more of the second plurality of index plies upon the inner surface of the skin member; forming an index with the first stack and the second index stack, the index comprising an index channel between an interior side of each of the first index stack and the second index stack, wherein the index is configured to cradle a support tool in the index channel;
aligning the support tool within the index channel;
depositing one or more stringer plies onto each the support tool, the first index stack, and the second index stack to form a stringer; and
joining the skin member, the first index stack, the second index stack, and the stringer plies.

11. The method of claim 10, wherein the stringer comprises a cap portion that spans from the first index stack to the second index stack to form a first flange portion and a second flange portion on the inner surface of the skin member, each flange portion extending from the cap portion.

12. The method of claim 11, wherein the index and the skin member are co-cured or co-bonded.

13. The method of claim 10, wherein the first index stack and the second index stack are configured to cradle the support tool such that the support tool lies flush against a portion of the interior side of each of the first index stack and the second index stack.

14. The method of claim 10, wherein the support tool is a forming mandrel.

15. The method of claim 10, wherein each of the first index stack and the second index stack comprises composite fibers pre-impregnated with a resin system.

16. The method of claim 10, wherein the support tool is automatically aligned within the index channel.

17. The method of claim 10, further comprising:
positioning a first filler on top of a first top index ply of the first plurality of index plies of the first index stack, and
positioning a second filler on top of a second top index ply of the second plurality of index plies of the second index stack.

18. The method of claim 10, wherein the stringer comprises:
a cap portion extending from the first index stack to the second index stack,
a first flange portion extending from a first side of the cap portion, the first flange portion located upon a first elongated base ply of the first index stack,
a second flange portion extending from a second side of the cap portion, the second flange portion located upon a second elongated base ply of the second index stack,
wherein the first elongated base ply and the second elongated base ply form a bottom layer of the first index stack and the second index stack, respectively.

19. The method of claim 10, wherein each of the first plurality of index plies and the second plurality of index plies are automatically aligned and deposited onto the inner surface of the skin member by a robotic assembly system.

20. An aircraft comprising one or more composite panels, the one or more composite panels comprising:

a skin member having an inner surface, an index coupled to the inner surface of the skin member for positioning a support tool on the inner surface, the index comprising: a first index stack of a first plurality of index plies, a second index stack of a second plurality of index plies, and a channel formed between an interior side of each of the first index stack and the second index stack, wherein the first index stack and the second index stack are configured to cradle a support tool in the channel; and wherein each of the first plurality of index plies and the second plurality of index plies comprises an elongated base ply as a bottom layer contacting the inner surface of the skin member, wherein an upper surface of each elongated base ply is substantially exposed from the respective plurality of index plies; and a stringer comprising: a cap portion extending from an exterior side of the first index stack to an exterior side of the second index stack, a first flange portion extending from a first side of the cap portion, the first flange portion located upon the upper surface of the elongated base ply of the first plurality of index plies, and a second flange portion extending from a second side the cap portion, the second flange portion located upon the upper surface of the elongated base ply of the second plurality of index plies.

\* \* \* \* \*